(12) United States Patent
Pillon et al.

(10) Patent No.: US 8,179,743 B2
(45) Date of Patent: May 15, 2012

(54) PROCEDURE FOR ELIMINATING GHOST SOURCES FROM PASSIVE SONAR COMPRISING SEVERAL LINEAR ANTENNAS

(75) Inventors: Denis Pillon, Nice (FR); Jean-Michel Passerieux, La Colle sur Loup (FR)

(73) Assignee: Thales, Neuilly sur Seine (FR)

( * ) Notice: Subject to any disclaimer, the term of this patent is extended or adjusted under 35 U.S.C. 154(b) by 288 days.

(21) Appl. No.: 12/517,195

(22) PCT Filed: Nov. 30, 2007

(86) PCT No.: PCT/EP2007/063102
§ 371 (c)(1),
(2), (4) Date: Aug. 20, 2009

(87) PCT Pub. No.: WO2008/065197
PCT Pub. Date: Jun. 5, 2008

(65) Prior Publication Data
US 2010/0080080 A1    Apr. 1, 2010

(30) Foreign Application Priority Data

Dec. 1, 2006    (FR) ..................................... 06 10528

(51) Int. Cl.
*G01S 3/80* (2006.01)
(52) U.S. Cl. ..................................................... 367/129
(58) Field of Classification Search ............. 367/129
See application file for complete search history.

(56) References Cited

U.S. PATENT DOCUMENTS 4,648,080 A * 3/1987 Hargreaves ................. 367/20
4,906,940 A * 3/1990 Greene et al. ................. 382/100

(Continued)

FOREIGN PATENT DOCUMENTS

EP    079506    5/1983

(Continued)

OTHER PUBLICATIONS

Halliday, D.; Resnick, R; Fundamentals of Physics, Second Edition. Ch. 18 (Sound Waves), p. 330 Wiley & Sons, NY. 1981.*

(Continued)

*Primary Examiner* — Thomas Tarcza
*Assistant Examiner* — James Hulka
(74) *Attorney, Agent, or Firm* — Stroock & Stroock & Lavan LLP

(57) ABSTRACT

This invention concerns the field of passive sonar systems simultaneously processing several linear antennas. This invention includes a method to eliminate ghost sources for a passive sonar having at least two linear antennas A and B, the method including: An initial acquisition step during which the signal received is measured at different moments $t_i$, and for each antenna, the Doppler frequency f of the signal received is determined, as well as the potential values of the azimuth θ of the source; A second step of determining the potential values of the source performed by use of the measured azimuth θ frequency f values; A third step of eliminating ambiguity and rejecting ghost sources during which it is determined, for which of the potential sources, the speed and frequency values will satisfy, for each moment $t_i$, the measurement equations linking the frequency of the signal received to the frequency $f_0$ emitted by the source, at the source speed and position. Embodiments of the invention concern harbor surveillance systems having several passive linear antennas laid on the seabed and located around the roadstead.

13 Claims, 4 Drawing Sheets

U.S. PATENT DOCUMENTS

| | | | |
|---|---|---|---|
| 5,089,972 A * | 2/1992 | Nachman et al. | 700/218 |
| 5,528,554 A * | 6/1996 | Posch et al. | 367/12 |
| 6,002,645 A * | 12/1999 | Booth | 367/123 |
| 6,493,636 B1 * | 12/2002 | DeKok | 702/17 |
| 6,681,887 B1 * | 1/2004 | Kragh et al. | 181/110 |
| 7,075,858 B2 | 7/2006 | Doisy et al. | |
| 2004/0071046 A1 * | 4/2004 | Kervern et al. | 367/129 |
| 2005/0099887 A1 * | 5/2005 | Zimmerman et al. | 367/12 |
| 2006/0109743 A1 * | 5/2006 | Kosalos et al. | 367/88 |
| 2006/0241914 A1 * | 10/2006 | Barnard et al. | 702/189 |
| 2008/0106466 A1 * | 5/2008 | Kelley et al. | 342/371 |

FOREIGN PATENT DOCUMENTS

| | | |
|---|---|---|
| EP | 0416992 | 3/1991 |
| EP | 1099958 | 5/2001 |
| FR | 2727765 | 6/1996 |
| GB | 2366617 | 3/2002 |
| WO | WO-03/019224 | 3/2003 |

OTHER PUBLICATIONS

Schurman, et al. "Reverberation REjection with a Dual-Line Towerd Array" Journal of Oceanic Engineering, vol. 21, No. 2 Apr. 1996, pp. 193-204.

* cited by examiner

PROCEDURE FOR ELIMINATING GHOST SOURCES FROM PASSIVE SONAR COMPRISING SEVERAL LINEAR ANTENNAS

CROSS-REFERENCE TO RELATED APPLICATION

This is a U.S. National Phase Application under 35 U.S.C. §371 of International Application no. PCT/EP2007/063102, filed Nov. 30, 2007, and claims benefit of French Patent Application No. 06 10528, filed Dec. 1, 2006, both of which are incorporated herein. The International Application was published in French on Jun. 3, 2008 as WO 2008/065197 under PCT Article 21 (2).

FIELD OF THE INVENTION

This invention concerns the field of passive sonar systems simultaneously operating several linear antennas for coast, harbor or port zone surveillance. This invention mainly concerns harbor surveillance systems having several passive linear antennas installed on the seabed and located around the roadstead.

This invention relates to the data processing field. More precisely, the problem handled concerns the elimination of ghost sources that appear when processing angles measured from a linear antenna.

CONTEXT OF THE INVENTION

Prior Art

Standard linear antennas, also called "streamers", generally comprise a set of omni-directional unit acoustic sensors or hydrophones located along the antenna. This structure makes angular measurements ambiguous with such antennas. The direction of the incoming acoustic signal corresponding to a bearing in relation to a given antenna, of the object, which emitted the signal, is not directly accessible as the field of ambiguity is defined around the axis of the antenna by a cone of revolution. The conical angles measured in this manner are still called "pseudo-bearings". When the source is far, or even at a shallow depth, the incoming elevation of the acoustic waves is close to zero. Then there is, from the angle at which the source is detected, two possible values symmetrical in relation to the reference axis, being the antenna axis (right/left ambiguity) which are converted into two azimuth values $\theta$ and $\theta'$ also called $Az^+$ and $Az^-$. The azimuth conventionally represents here the value of the angle defined by the north and the signal incoming direction, which corresponds to the "source-to-antenna" axis. These two azimuth values define two separate directions in space, of which only one corresponds to the effective position of the source.

A known method to eliminate the right/left ambiguity in the case of linear antennas consists of splitting the antenna using two or more parallel linear antennas and by combining the signals received by each antenna to make up a reception channel, for which the diagram is not ambiguous.

Another known method is to equip the streamer with directive acoustic sensors or groups of omni-directional elementary sensors, for example, hydrophone triplets, devices enabling some right/left rejection.

In the case of a surveillance network comprising linear antennas laid on the sea bed, the use of hydrophone triplet linear antennas is not necessarily an appropriate solution to efficiently eliminate the ambiguity, as the phases of the signals received may be disturbed by reflections on the sedimentary layers. Consequently, the right/left rejection obtained may be of a lower quality than in deep water. The same applies when two streamers are used in parallel. In this case, there is either an additional supplementary problem in ensuring the parallelism if the streamers are not precisely side-by-side or the disadvantage of a possible loss of sensitivity if they are.

These two known methods have, in substantially all cases, the disadvantage of increasing the number of hydrophones required to make up a linear antenna. The effect of this increase is to increase the manufacturing cost of the linear antenna implemented and this of the associated receiver, and therefore the global cost of the system required for complete coverage of a zone.

Another method is to operate coherently the two antennas simultaneously, i.e. make up a channel formation encompassing substantially all sensors of the two antennas. In a less costly manner, partial coherent processing may be made by, for example, time correlation of signals from the source and from the two antennas. The disadvantage of these up-line signal-processing techniques is that the sensors must be sampled in a perfectly synchronous manner. This assumes that it is possible to distribute a common clock signal to the two antennas, which is not always possible. Furthermore, this assumes that access to signals transiting in the up-line processing system of the sonar is available, which is not always possible if already existing sonars are used.

In the case of a towed antenna, therefore mobile, it is in addition possible to eliminate the right/left ambiguity by varying the orientation of the antenna. However, to do this the ship must maneuver in a manner so that the operation eliminating the ambiguity takes a relatively long time (typically around 10 minutes). Furthermore, this possibility is not available when working with fixed antennas.

The current methods making it possible to eliminate the ambiguity with fixed antennas, therefore appear as being costly solutions requiring in addition the implementation of more powerful means of computation to handle the increase of information flow following the implementation of a greater number of sensors. The use of more complex antennas associated with more powerful processing means entail a significant increase to the global cost of the surveillance sonar system. Therefore, the preference it to use conventional antennas fitted with omni-directional sensors, which are ambiguous.

One of the consequences from the ambiguity of angle measurement is that when there is a need to locate the source by triangulation, there may be several intersections in the lines of sight. Only one corresponds to the effective source, the others being false solutions, called ghost sources that are to be eliminated even though the antennas constituting the network remain right/left ambiguous.

PRESENTATION OF THE INVENTION

One purpose of the invention is to propose a solution making it possible to use omni-directional sensor passive linear antennas, naturally ambiguous, to make up an underwater surveillance system capable of eliminating ghost sources appearing during the detection of sources located in the monitored zone or starting to enter this zone.

To this end, the object of the invention is a procedure for eliminating the ambiguity in the localization of a signal source and the rejection of "ghost" sources due to this ambiguity by means of a passive sonar including at least two linear antennas, A and B, separate one from the other. The procedure according to an embodiment of the invention mainly includes:

An initial step (step 21) involving the acquisition of azimuth measurement $\theta(t_i)$ and measurements of the frequency $f(t_i)$ of the signal received. The measurements are made at different moments of measurement $t_i$. The signal received corresponds, to within the Doppler effect, to the signal emitted by the source(s) detected(s).

A second step (step 22) for determination of the speed values corresponding to the different potential sources, and possibly the corresponding frequency $f_0$ of the signal emitted by these sources. This estimation of the parameters characterizing the potential sources is made using the frequency values measured $f(t_i)$ and azimuth values $\theta(t_i)$ measured during the first step (step 21) at different moments $t_i$.

A third step (step 23) includes determining the real source and eliminating the wrong solutions (ghost sources). During this step, the coherence of the values associated with each potential source are assessed in relation to a model represented by a set of measurement equations linking incoming direction and the received signal frequency to the speed, position and possibly to the transmission frequency of the potential source involved.

Then the ambiguity is eliminated by determining the potential source for which the speed, position and frequency values, satisfy these equations for each measurement moment $t_i$. This potential source is considered as the real source. The other potential sources, considered as ghost sources, are rejected.

According to an initial method of implementation of an embodiment of the invention for two antennas A and B, the measurement equations used during step 23, are equations linking the Doppler frequency of the signal received to the frequency $f_0$, to the azimuth $\theta$ and to the Cartesian components $v_x$ and $v_y$ of speed V of the source.

According to an initial variant of this first implementation mode of the procedure, according to an embodiment of the invention, during step 22, the components $v_x$ and $v_y$ of the potential source speed involved, whether real or ghost, will be determined by triangulation (intersection of the lines of sight from two antennas) at different moments.

According to a second variant of this first implementation mode, the possible values of the frequency $f_0$ and components $v_x$ and $v_y$ of the speed of the object involved are calculated during step 22, by performing a series of N frequency measurements $f(t_i)$ and azimuth measurements $\theta(t_i)$ received by each of the antennas at consecutive moments $t_i$. These three unknowns are computed by solving an over-determined linear system by the least square method.

To this end, the azimuth measurements $\theta_A(t_i)$ and $\theta_B(t_i)$ obtained by means of antennas A and B are used, and the linear equation system represented by the 2N relations expressed in a synthetic manner by the following equation is solved:

$$F = M \cdot X$$

where X represents the status vector $X=[f_0; f_0v_x; f_0v_y]^T$ and where M represents a measurement matrix with 2N lines, in which each line is expressed as follows (c, celerity of sound assumed known):

$$M_A(t_i)=[1; -\sin\theta_A(t_i)/c; -\cos\theta_A(t_i)/c]$$

$$M_B(t_i)=[1; -\sin\theta_B(t_i)/c; -\cos\theta_B(t_i)/c],$$

each line $M_A(t_i)$ or $M_B(t_i)$ corresponding to a measurement moment $t_i$, and F to a vector with 2N components constituted by the measurement pairs of frequencies received ($f_A(t_i)$, $f_B(t_i)$) measured at N moments $t_i$.

According to these two variants, the measurement equations used during step 23 are expressed as follows:

$$f_A(t_i)=f_0[1-(v_x\cdot\sin\theta_A(t_i)+v_y\cdot\cos\theta_A(t_i))/c]$$

$$f_B(t_i)=f_0[1-(v_x\cdot\sin\theta_B(t_i)+v_y\cdot\cos\theta_B(t_i))/c]$$

where c represents the celerity of sound, assumed known, and where $v_x$ and $v_y$ represent the components of speed $\vec{V}$ of the source in a Cartesian reference system.

According to a third variant of this first implementation mode, the components $v_x$ and $v_y$ of the potential source speed considered are determined, during step 22, by applying an extended Kalman filter on the status vector $X=[x; v_x; y; v_y; f_0]$ subject to a certain status noise defined beforehand to estimate the possible values of the Cartesian components of the speed of the object emitting the measured signal and of the corresponding frequency of the emitted signal.

According to this variant, the remainder or the innovations issued from the filter are analyzed during step 23. Subsequently, the real source then corresponds to the residuals mostly centered around zero.

According to a second mode of implementation of the invention, for two antennas A and B, the measurement equations used during step 23 are equations linking the Doppler frequency of the signal received to the frequency and to the radial speed $\dot{\rho}$ of the source. At reference moment $t_R$ (any reference moment) they are expressed as follows:

$$f_A(t_R)=f_0[1-\dot{\rho}_A(t_R)/c]$$

$$f_B(t_R)=f_0[1-\dot{\rho}_B(t_R)/c]$$

the values $\dot{\rho}_A(t_R)$ and $\dot{\rho}_B(t_R)$ are determined separately from the measurements collected at each antenna by solving the equation system:

$$\sin\theta_A(t_R)\cdot\dot{\rho}_A(t_R)-\sin\theta_B(t_R)\cdot\dot{\rho}_B(t_R)=-\cos\theta_A(t_R)\cdot\rho_A(t_R)\cdot\dot{\theta}_A(t_R)+\cos\theta_B(t_R)\cdot\rho_B(t_R)\cdot\dot{\theta}_B(t_R)$$

$$\cos\theta_A(t_R)\cdot\dot{\rho}_A(t_R)-\cos\theta_B(t_R)\cdot\dot{\rho}_B(t_R)=\sin\theta_A(t_R)\cdot\rho_A(t_R)\cdot\dot{\theta}_A(t_R)-\sin\theta_B(t_R)\cdot\rho_B(t_R)\cdot\dot{\theta}_B(t_R)$$

where $\dot{\theta}_A(t_R)$ and $\dot{\theta}_B(t_R)$ represent the derivative values of the azimuth measurements $\theta_A(t_R)$ and $\theta_B(t_R)$ at this same reference moment $t_R$.

According to an first variant of this second implementation mode, the derivatives $\dot{\theta}_A(t_R)$ and $\dot{\theta}_B(t_R)$ are determined by linear Kalman filtering of angle measurement made during step 21 (status vector Kalman filter ($\theta$, $\dot{\theta}$), or alpha-beta filtering)

According to another variant of this second implementation mode, $\dot{\theta}_A(t_R)$ and $\dot{\theta}_B(t_R)$ are determined by a graphic method.

Whatever the method of implementation of the invention, the procedure according to an embodiment of the invention makes it possible to advantageously eliminate the ghost sources by means of a sonar system using conventional passive linear antennas, which present inherently a right/left ambiguity, and this without additional equipment being necessary.

The procedure according to an embodiment of the invention is advantageously adaptable to a large range of sonar systems that may include a variable number of linear antennas distant one from the other.

Advantageously, the procedure according to an embodiment of the invention is implemented using conventional measurements of frequency and bearing. The elimination of ambiguity to the measured bearing by different antennas is obtained by using the results from measurements made on signal samples obtained at different measurement moments.

DESCRIPTION OF THE FIGURES

The characteristics and the advantages of the different aspects of the invention will clearly appear in the following description. The description is associated with the attached figures representing FIG. 1, an illustration of the ambiguity problem appearing when linear antennas including omni-directional acoustic sensors are used, FIG. 2, an organizational chart of the mains steps of the procedure according to an embodiment of the invention, FIG. 3, illustration of the first implementation mode of the procedure according to the invention, FIG. 4, illustration of the situation corresponding to the detection of an object according to a uniform rectilinear movement (MRU).

DETAILED DESCRIPTION

Figure 1:
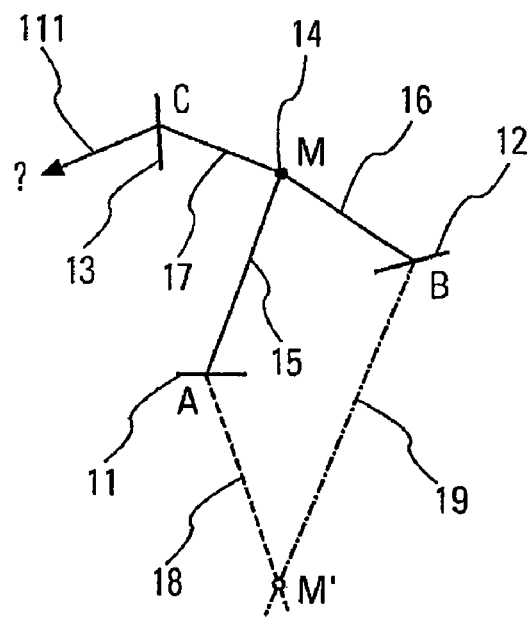

First of all, consider FIG. 1, illustrating the specific case of a passive sonar system including three linear antennas A, B and C of which the axes are illustrated by segments 11, 12, and 13. With this type of system, an object 14 emitting a signal with sinusoidal components in an omni-directional manner may be detected by each of the antennas. When the signal source is far or when detection is made in a shallow zone, the incoming elevation of the acoustic waves may, in general, be considered as being close to zero. Subsequently the system has at its disposal, for each antenna, two angles of measurement corresponding to symmetrical directions, 15-18, 16-19 or 17-111, in relation to the antenna axis. These angle measurements are each converted into two azimuth values called $\theta^+$ and $\theta^-$ related to the detected object. For example, an azimuth $\theta^+$, corresponds to the real position of the source of the signal received and an azimuth $\theta^-$, for example, corresponds to a virtual position of the source. In this case a ghost source is invoked. It is assumed here that there is only one real source. In the case of multiple sources, it is assumed that it is possible to associate beforehand the tracks from each source, for example, by testing the similarity of the frequencies received or their time fluctuations.

This ambiguity, which appears at each antenna considered separately from the others is naturally eliminated when the system involved includes at least three antennas detecting the source. In fact, as illustrated by the figure, the real position of the object, which emitted the detected signal, may be determined simply by triangulation. Only axes 15, 16 and 17, corresponding to the directions in which the object is effectively located in relation to each of the antennas, incorporate an intersection corresponding approximately to the real position of the object, whereas axes 18, 19 and 111, corresponding to the virtual directions, do not incorporate any common intersection. On the other hand, as we see in FIG. 1, if the system only includes two antennas or if detection is only made by two of the antennas including the system, the ambiguity of the position cannot be eliminated in such a simple manner.

Figure 2:
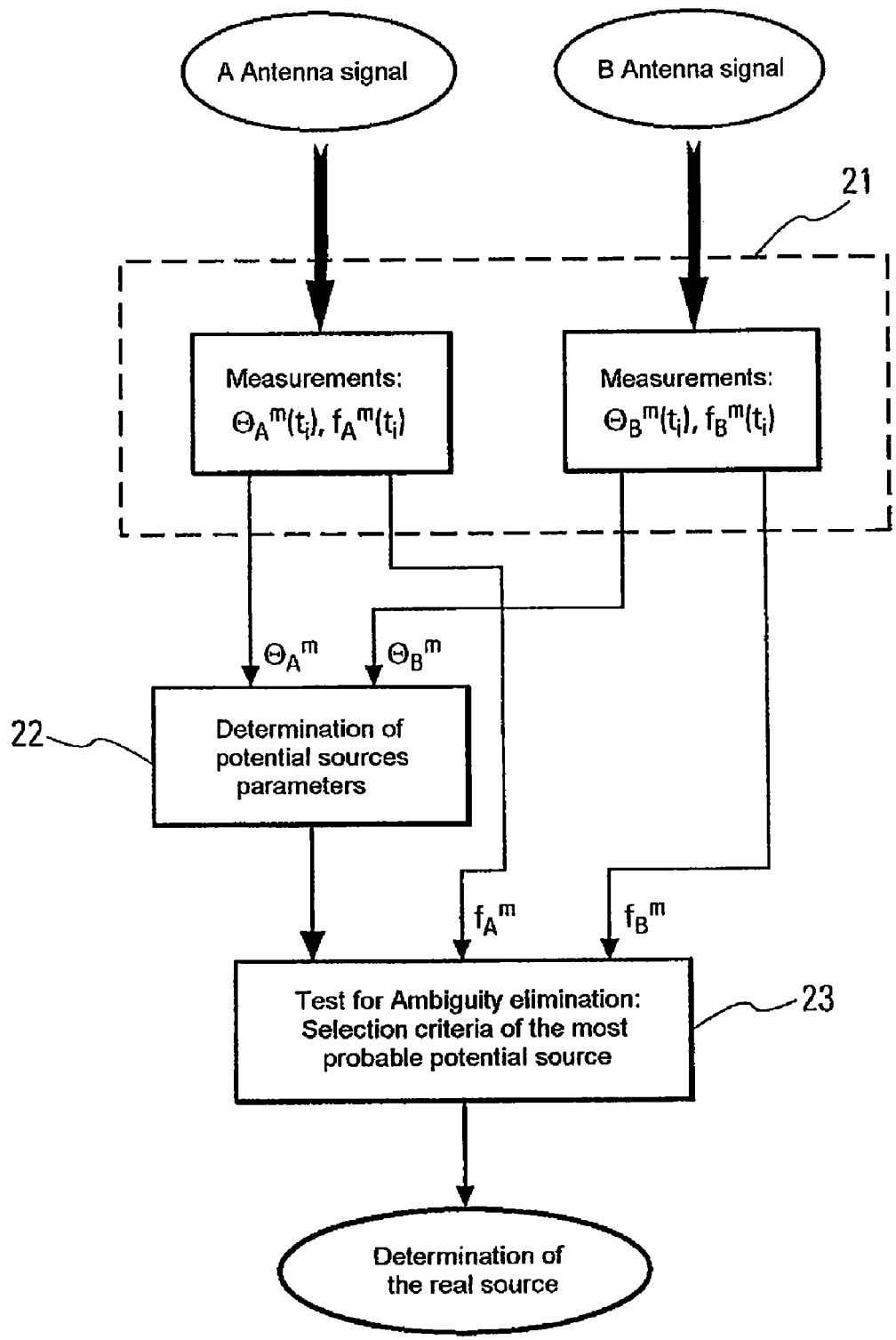
Figure 4:
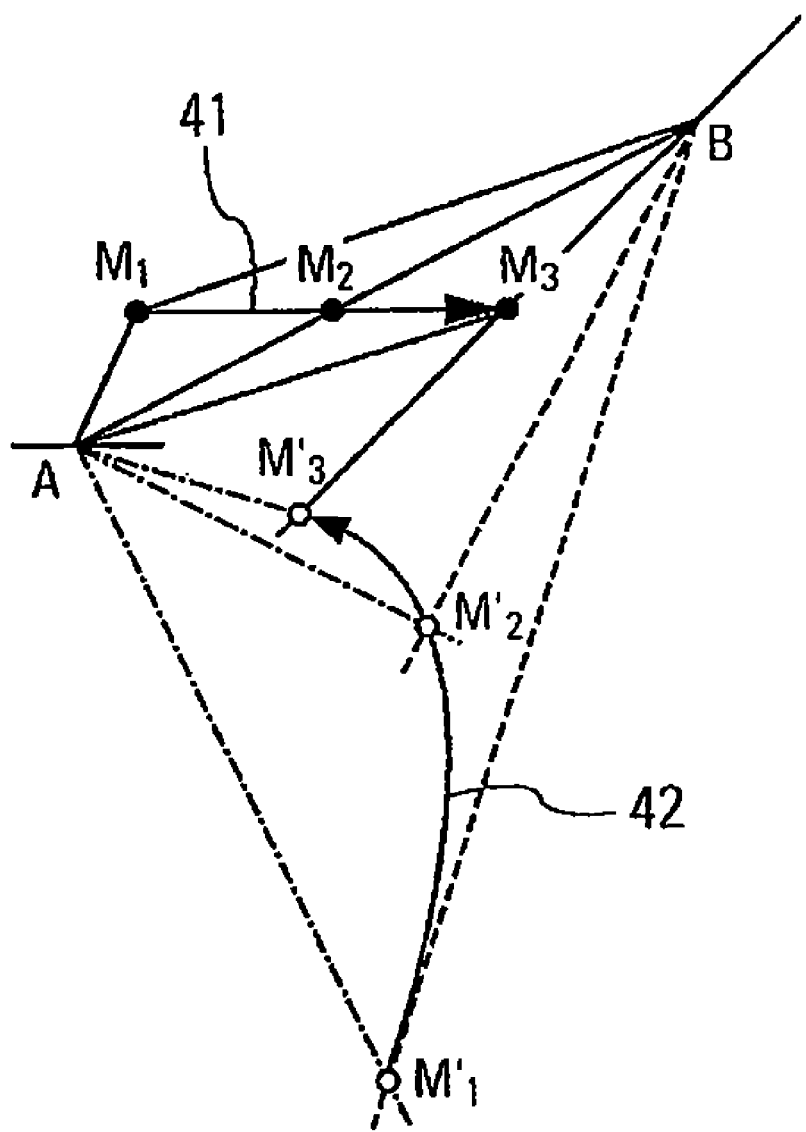

Then consider FIG. 2 showing the organizational chart of the steps of the procedure according to an embodiment of the invention.

As can be seen in this figure, the procedure according to an embodiment of the invention includes three main steps:

- an initial step, 21, for acquisition of data normally provided by a passive sonar. This data is azimuth measurements $\theta(t_i)$ and frequency measurements $f(t_i)$ of the signal received,
- a second step, 22, for estimation of the parameters representing the kinematics of each potential source and possibly its transmission frequency.
- a third step, 23, for assessment for each potential source, of the coherence of the estimated values and measured magnitudes; a step performing the selection operation of the real source and elimination of ghost sources.

The first step of the procedure according to an embodiment of the invention, step 21, includes analyzing the signals received by the two linear antennas A and B, by applying a conventional narrow band passive sonar processing operation on these signals. The spectrum of the signal received may be a pure frequency or even a narrow band line spectrum.

Thus, for each antenna, the frequencies ($f_A$ and $f_B$) of the signal received as well as bearings $G_A$ and $G_B$ are determined, in which the detected object is located in relation to each of the antennas. As stated previously, this bearing is determined with a right/left ambiguity. Therefore the two possible bearing values for each antenna are obtained; bearing values, which are translated by two azimuth values $\theta_A^+$ ($\theta_B^+$) and $\theta_A^-$ ($\theta_B^-$) for each antenna. As stated previously, the azimuth represents here, in a conventional manner, the value of the angle defined by the north direction and the direction linking the center of symmetry of the antenna to the signal source, as these angles are counted down positively clockwise. Thus, for each antenna two azimuth values $\theta^+$ and $\theta^-$ are obtained, of which only one corresponds to the real direction in which the detected source is located. According to an embodiment of the invention, the frequency and bearing measurements are made at different moments $t_i$.

The second step of the procedure according to an embodiment of the invention, step 22, includes determining the movement speed of the source by means of its Cartesian components $v_x$ and $v_y$ for example, in a fixed reference.

This determination is by means of azimuth values measured in the previous step 21, knowing that the source is considered as being in an approximately uniform rectilinear motion (MRU) during the measurement time. As said previously, this azimuth measurement is an ambiguous measurement, giving two possible azimuth values for each antenna. Thus, step 22 naturally provides several possible values of the source speed; values of which one truly corresponds to the source and of which the others can be called ghost sources.

Figure 3:
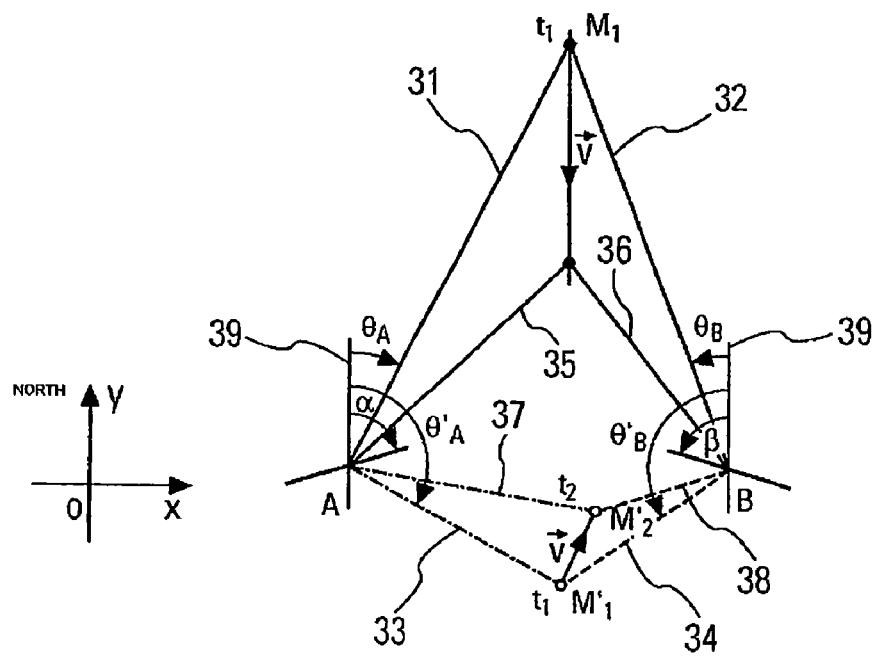

As shown in this figure, the implementation of the procedure according to an embodiment of the invention assumes that the surveillance system involved includes at least two linear antennas of which the axes are not co-linear, i.e. not aligned on the same straight line. This restriction represents the general case of the surveillance systems considered, in view of the laying constraints of antennas in a roadstead. Nevertheless, for other cases of use, it is necessary to take this restriction into account when the positioning of the antennas making up the system is defined. FIG. 3 illustrates the case of a system including two linear antennas A and B, case using a typical but non-limitative example.

Note that there are numerous cases where the intersection of the lines of sight corresponding to the segments, materializing the incoming direction of the signal on each antenna, do not always exist for the two possible directions of each antenna. The case illustrated by FIG. 3 corresponds to a case where the orientation of the antennas entails an ambiguity, a case where it is necessary to eliminate the ambiguity. In a different case, for example, the case of a sonar system of which the antennas layout is relatively similar to the layout of antennas 12 and 13 of FIG. 1 the ambiguity in determining the position of the detected source does not exist, two of the sighting directions having no point of intersection. In addition, in certain other cases, one of the two determined positions is located in an impossible location, for example on a nearby coast. In such a case, the determination of the solution corresponding to the real source during step 23 is simple and immediate.

The third step of the procedure according to an embodiment of the invention, step 23 includes, as previously explained, eliminating the ambiguity resulting from steps 21 and 22. During this step, the real source is determined and the ghost sources eliminated. To achieve this, the speed composition and possibly the frequency values are considered for each potential source and then these values are verified to check whether they satisfy, for each moment the measurement equations linking the incoming directions and the frequency of the signals received to the speed, the position of the source and possibly the frequency of the signal emitted by the potential source involved.

The potential source satisfying these measurement equations is accepted. The other sources are rejected, as being ghost sources.

Depending on the implementation method selected and the reference selected to express the potential source position and speed measurements, the measurement equations are expressed differently. In the rest of the descriptions, several implementation methods are presented as examples.

Now, FIG. 3 is considered, which illustrates a first implementation method of the procedure according to the invention.

As this figure illustrates, in this first implementation method presented as an example, the procedure according to an embodiment of the invention performs, in step 22, the estimation of the parameters associated with the movement of the object at the source of the detected signal, especially its movement speed or, more exactly in this case, the components of this speed defined in an absolute Cartesian reference of which one of the axes, axis y in the example in the figure, is plotted by the north direction.

The incoming directions determined are materialized on the figure by half-straight lines 31 to 38. The intersection of the half-straight lines (or lines of sight) corresponding to a given moment, make it possible to define the potential positions that may correspond to the position of the object at a given moment. Amongst these potential positions, only one corresponds to the real position of the object and the others correspond to virtual objects or ghost sources.

Thus, for example, the intersections of segments 31 and 32 on the one hand and segments 33 and 34 on the other hand make it possible to estimate the two possible positions $M_2$ and $M'_2$ for the source at moment $t_2$, positions identified by their Cartesian coordinates x and y. Then using the estimated positions at moments $t_1$ and $t_2$, it is possible to determine the two corresponding speeds v and v'.

Note here that, because amongst the two positions $M_i$ and $M'_i$ estimated at a given moment one is real and the other virtual, the same applies to the estimated speeds $\vec{V}$ and $\vec{V}$ and therefore determining which of the speeds is virtual, is the same as determining what is the true incoming direction of the signal.

In a first variant of this first implementation method, the Cartesian components $v_x$ and $v_y$ of the speed vector are estimated by triangulation, according to a method called indirect or semi-graphic. As illustrated in FIG. 3, this method in practice includes determining, for example, graphically, the positions M(x, y) and M'(x', y') of the source corresponding to the azimuths measured at moments $t_i$. This, for example, may be done using graphic tools. Then the corresponding speed vectors $\vec{V}$ and $\vec{V}$ are determined using the determined positions.

Thus in the example of the FIG. 3, the possible positions of the source are determined by means of measurements made at two consecutive moments, $t_1$ and $t_2$, on the signals received by antennas A and B. Thus for $M_1$ and $M'_1$ on the one hand for $t=t_1$ and $M_2$ and $M'_2$ on the other hand for $t=t_2$ are obtained.

Using these positions, the possible corresponding values $\vec{V}$ and $\vec{V}'$ of the speed vector are estimated. Movement of the source is assumed uniform and rectilinear. In practice, the Cartesian components $(v_x, v_y)$ and $(v'_x, v'_y)$ of vectors $\vec{V}$ and $\vec{V}'$ are determined by means of the following relation:

$$v_x = \frac{x_2 - x_1}{t_2 - t_1} \text{ and } v'_x = \frac{x'_2 - x'_1}{t_2 - t_1} \qquad [1]$$

$$v_y = \frac{y_2 - y_1}{t_2 - t_1} \text{ and } v'_y = \frac{y'_2 - y'_1}{t_2 - t_1} \qquad [2]$$

In a second variant of this first implementation mode, the Cartesian components $v_x$ and $v_y$ of the speed vector estimated by means of a method called the direct method, includes defining a transposed vector $X^T$ of the status vector $X=[f_0; f_0 v_x; f_0 \cdot v_y]$, and a measurement matrix M where each line is defined for a measurement moment $t_i$ given by one of the following relations:

$$M_A(t_i)=[1; -\sin \theta_A(t_i)/c; -\cos \theta_A(t_i)/c] \qquad [3]$$

and $$M_B(t_i)=[1; -\sin \theta_B(t_i)/c; -\cos \theta_B(t_i)/c] \qquad [4]$$

where $\theta_A(t_i)$ corresponds for the moment $t_1$ considered, to one of the possible incoming directions of the signal on antenna A, whereas $\theta_B(t_i)$ corresponds to one of the possible incoming directions of the signal on antenna B; c representing here, as previously stated, the celerity of sound.

In such a manner, a vector F, of dimension 2N, of which the components correspond to N pairs of frequency measurements $(f_A(t_i), f_B(t_i))$ of the signals received by antennas A and B, obtained for N consecutive moments $t_i$, may be defined by the following relation:

$$F = M \cdot X \qquad [5]$$

where M is the measurement matrix including 2N lines $M_A(t_i)$ and $M_B(t_i)$.

The expression of the components of vector F is then:

$$F_A(t_i) = M_A(t_i) \cdot X \qquad [6]$$

and $$F_B(t_i) = M_B(t_i) \cdot X \qquad [7]$$

Subsequently, the estimation of X will then be made by resolution of this over determined linear system, as per the least square method.

In this first implementation mode of the procedure according to an embodiment of the invention, especially for the two variants described previously, the expression of the equation of measurements considered is:

$$f_A(t_i) = f_0[1 - (v_x \cdot \sin \theta_A(t_i) + v_y \cdot \cos \theta_A(t_i))/c] \qquad [8]$$

$$f_B(t_i) = f_0[1 - (v_x \cdot \sin \theta_B(t_i) + v_y \cdot \cos \theta_B(t_i))/c] \qquad [9]$$

where c represents the celerity of sound, assumed known, and where $v_x$ and $v_y$ represent the components of the speed $\vec{V}$ of the source in a Cartesian reference system.

Subsequently, step 23 of the evaluation of the coherence includes, first of all, calculating for each moment $t_i$ considered, the value of magnitude $v^m$ defined by the relation:

$$v^m(t_i) = (f_A(t_i) - f_B(t_i))/(f_A(t_i) + f_B(t_i)) \quad [10]$$

where $f_A(t_i)$ and $f_B(t_i)$ represent the frequency measurements of the signal received by each of the antennas at measurement moment $t_i$.

According to this method, the pair of estimated values $(v_x, v_y)$ or $(v'_x, v'_y)$ of the Cartesian components of the speed of the object is considered and for each antenna the computation is made for each pair of magnitude $v$ defined by the relation:

$$v(t_i) = \frac{v_x \cdot (\sin\theta_A(t_i) - \sin\theta_B(t_i)) + v_y \cdot (\cos\theta_A(t_i) - \cos\theta_B(t_i))}{v_x \cdot (\sin\theta_A(t_i) + \sin\theta_B(t_i)) + v_y \cdot (\cos\theta_A(t_i) + \cos\theta_B(t_i)) - 2c} \quad [11]$$

where $\theta_A(t_i)$ and $\theta_B(t)$ represent the azimuths measured at the moment $t_i$ considered.

Thus, for each potential source, a given value of magnitude $v$ is obtained. Thus, for a system including two antennas A and B and for each measurement moment $t_i$, there are four possible values of the magnitude $\theta$, being values corresponding to the association of the different measured azimuth values:

$$v_1(t_i) = \frac{v_x(\sin\theta_A(t_i) - \sin\theta_B(t_i)) + v_y(\cos\theta_A(t_i) - \cos\theta_B(t_i))}{v_x(\sin\theta_A(t_i) + \sin\theta_B(t_i)) + v_y(\cos\theta_A(t_i) + \cos\theta_B(t_i)) - 2c} \quad [12]$$

$$v_2(t_i) = \frac{v_x(\sin\theta_A(t_i) - \sin\theta'_B(t_i)) + v_y(\cos\theta_A(t_i) - \cos\theta'_B(t_i))}{v_x(\sin\theta_A(t_i) + \sin\theta'_B(t_i)) + v_y(\cos\theta_A(t_i) + \cos\theta'_B(t_i)) - 2c} \quad [13]$$

$$v_3(t_i) = \frac{v_x(\sin\theta'_A(t_i) - \sin\theta_B(t_i)) + v_y(\cos\theta'_A(t_i) - \cos\theta_B(t_i))}{v_x(\sin\theta'_A(t_i) + \sin\theta_B(t_i)) + v_y(\cos\theta'_A(t_i) + \cos\theta_B(t_i)) - 2c} \quad [14]$$

$$v_4(t_i) = \frac{v_x(\sin\theta'_A(t_i) - \sin\theta'_B(t_i)) + v_y(\cos\theta'_A(t_i) - \cos\theta'_B(t_i))}{v_x(\sin\theta'_A(t_i) + \sin\theta'_B(t_i)) + v_y(\cos\theta'_A(t_i) + \cos\theta'_B(t_i)) - 2c} \quad [15]$$

Subsequently, the evaluation operation of the coherence itself includes then calculating for each value $v$, the deviation value $v - v^m$. The value of $v$ given the lowest deviation $v - v^m$ then corresponds to the position of the potential source representing the real source. The other potential sources are then considered as ghost sources and are then rejected.

In a third variant of this first implementation mode, step 21 includes, in an even more direct manner, applying an extended Kalman filter "EKF" to the status value $X = [x; v_x; y; v_y; f_0]$ subject to a certain previously defined status noise. The measurement equations used during steps 23 are then as follows, where the symbol "Atan" represents the Arctangent function:

$$\theta_A = A\tan\frac{x_A}{y_A} \quad [16]$$

and $$\theta_B = A\tan\frac{x_B}{y_B} \quad [17]$$

for the azimuth measurements, $$f_A(t_i) = f_0[1 - (v_x \cdot \sin\theta_A(t_i) + v_y \cdot \cos\theta_A(t_i))/c] \quad [18]$$

and $$f_B(t_i) = f_0[1 - (v_x \cdot \sin\theta_A(t_i) + v_y \cdot \cos\theta_A(t_i))/c] \quad [19]$$

for the frequency measurements.

The quantities $f_A$, $f_B$, $\theta_A$ and $\theta_B$ represent the values of the signal frequency received and the azimuth measured during step 21, for each of the two antennas A and B.

In this variant, a possible method to assess the coherence of measurements with regard to the model includes, when possible, estimating the transmission frequency $f_0$ of the source and, on the conditions that there are a sufficient number of measurements, in testing the frequency remainders made up by the different deviations between calculated frequencies $[f_A(t_i), f_B(t_i)]$ using estimated values of the speed and azimuth values at moments $t_i$ and the values $[f_A^m(t_i), f_B^m(t_i)]$ measured on the signal samples received at different moments $t_i$.

Subsequently, the real position of the source is then where the greatest amount of remainders centered around zero is obtained.

Figure 5:
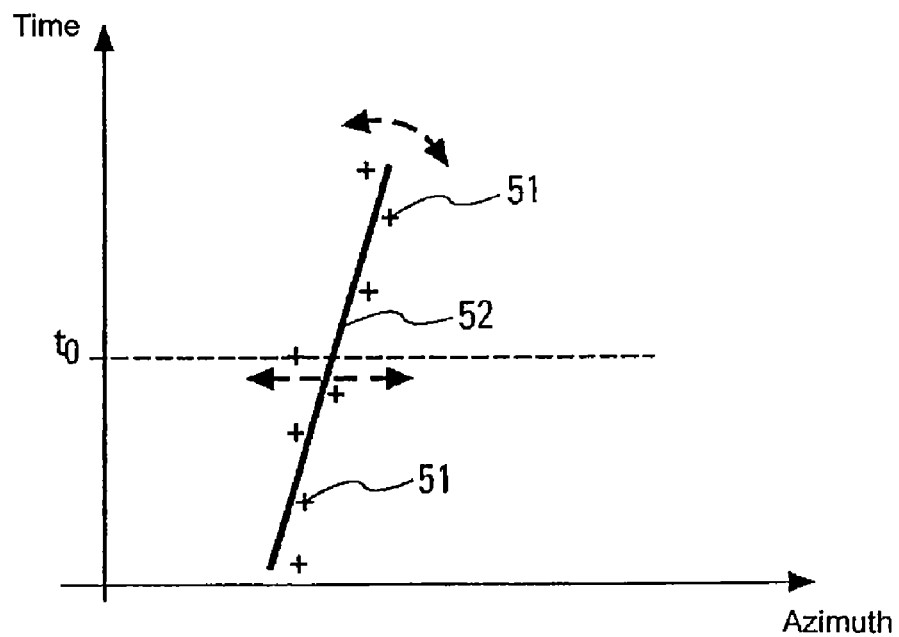
FIGS. 5 and 6, illustration of a second implementation mode of the procedure according to the invention.
Figure 6:
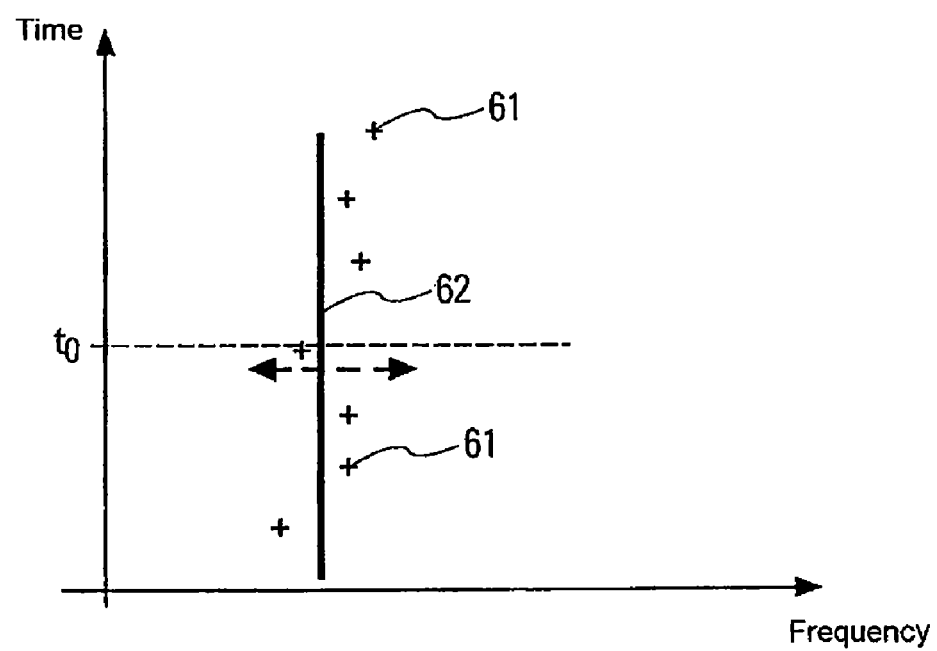

Then consider FIGS. 5 and 6 illustrating a second implementation mode of the procedure according to an embodiment of the invention. In this second mode, attention is paid to the parameters characterizing the movement of the source detected directly in relation to the antenna involved, especially the distance $\dot{\rho}$ separating the source of the antenna involved and the radial speed $\dot{\theta}$ of the source in relation to this same antenna.

According to this second implementation mode, measurement step 21 includes, as previously and for each of the antennas A and B, measuring the frequency $f_A$ or $f_B$ of the signal received (with the offset due to the Doppler), and on the other hand, of measuring the azimuths $\theta_A$ or $\theta_B$ corresponding to the incoming direction of the signal emitted by the source. According to this implementation mode, these measurements are made consecutively at different moments t.

According to this second implementation mode, step 22 includes determining the radial speed $\dot{\rho}$ of the source, measured by each antenna, at reference moment $t_R$. According to an embodiment of the invention, this speed $\dot{\rho}(t_R)$ is calculated from the corresponding radial distance $\rho(t_R)$ and the drift of the azimuth measurement $\theta(t_i)$ noted $\dot{\theta}(t_R)$. Thus, for two antennas A and B, $\rho_A(t_R)$, $\rho_B(t_R)$, $\dot{\theta}_A(t_R)$, $\dot{\theta}(t_R)$ is determined and subsequently $\dot{\rho}_A(t_R)$ and $\dot{\rho}_B(t_R)$.

According to an embodiment of the invention, the radial distances are calculated from azimuth measurements using the following relations:

$$x(t_R) - x_A = \rho_A(t_R) \cdot \sin\theta_A(t_R)$$

for antenna A $$y(t_R) - y_A = \rho_A(t_R) \cdot \cos\theta_A(t_R) \quad [20]$$

and $$x(t_R) - x_B = \rho_B(t_R) \cdot \sin\theta_B(t_R)$$

for antenna B $$y(t_R) - y_B = \rho_B(t_R) \cdot \cos\theta_B(t_R) \quad [21]$$

where $(x_A, y_A)$ and $(x_B, y_B)$ respectively represent the assumed known coordinates of antenna A and antenna B relatively to a Cartesian reference system of which the y axis coincides with the north direction, and where $(x(t_i), y(t_i))$ represents respectively the coordinates of the source in the same reference system.

Note that the system [20-21] of four equations with four unknowns $(x(t_R), y(t_R), \rho_A(t_R), \rho_B(t_R))$ accepts, in a known manner, a unique solution as long as the azimuths $\theta_A(t_R)$ and $\theta(t_R)$ are different.

Also note that here the antennas A and B are assumed fixed and therefore that $(x_A, y_A)$ and $(x_B, y_B)$ are independent from time. However, an analogous method may apply to a system including mobile antennas, as long as their speed is known. Subsequently, from relations [20] and [21], the following system is obtained by eliminating $x(t_R)$ and $y(t_R)$:

$$\sin\theta_A(t_R) \cdot \rho_A(t_R) - \sin\theta_B(t_R) \cdot \rho_B(t_R) = -x_A + x_B$$

$$\cos\theta_A(t_R) \cdot \rho_A(t_R) - \cos\theta_B(t_R) \cdot \rho_B(t_R) = -y_A + y_B \quad [22]$$

then by deriving in relation to time:

$$\sin\theta_A(t_R) \cdot \dot\rho_A(t_R) - \sin\theta_B(t_R) \cdot \dot\rho_B(t_R) = -\cos\theta_A(t_R) \cdot \rho_A(t_R) \cdot \dot\theta_A(t_R) + \cos\theta_B(t_R) \cdot \rho_B(t_R) \cdot \dot\theta_B(t_R)$$

and $$\cos\theta_A(t_R) \cdot \dot\rho_A(t_R) - \cos\theta_B(t_R) \cdot \dot\rho_B(t_R) = \sin\theta_A(t_R) \cdot \rho_A(t_R) \cdot \dot\theta_A(t_R) - \sin\theta_B(t_R) \cdot \rho_B(t_R) \cdot \dot\theta_B(t_R) \quad [23]$$

Thus, a system with two equations with two unknowns $\dot\rho_A$ and $\dot\rho_B$ is obtained, accepting in a known manner a unique solution as long as $\theta_A$ is different from $\theta_B$.

To solve the system [21] and determine the values of $\dot\rho_A$ and $\dot\rho_B$ it is necessary to know not simply the measurements of azimuths $\theta_A$ and $\theta_B$, but also the values of the variations $\dot\theta_A$ and $\dot\theta_B$ of these azimuths over time. $\dot\theta_A$ and $\dot\theta_B$ may be determined by different known methods, of which two corresponding to the preferred implementation mode are presented below.

According to a preferred first form of this second implementation mode of the procedure according to an embodiment of the invention, $\dot\theta_A$ and $\dot\theta_B$, are determined during step 22, by separately applying to the azimuth measurements obtained on antennas A and B a Kalman filter with dynamics order 1 (status vector $(\theta_B; \dot\theta_B)$. Thus linearization of the law of variation of these measurements is made.

In addition, an estimation of frequencies related to source movement in relation to antennas A and B is made by applying to frequency measurements $f_A$ and $f_B$ a Kalman filter with a dynamics order 0 (with as status vector $X=(f)$). Thus, smoothing is obtained during measured $f_A$ and $f_B$ frequency time.

Subsequently, the output from these filters obtained is an estimation at current moment of magnitudes $(\theta_A, \theta_B, \dot\theta_A, \dot\theta_B, f_A, f_B)$, estimation used during the next step to determine the values $\dot\rho A$ and $\dot\rho B$ of the radial speeds.

According to a second preferred form of this implementation mode, the determination of $\dot\theta_A(t_R)$ and $\dot\theta_B(t_R)$ is obtained graphically. This form is in particular applicable in the case where means are available making it possible to represent measurement of signals received in an azimuth/time or frequency/time reference system on a screen, so as to have graphic representations such as those illustrated in FIGS. 5 and 6.

In this type of case, a representation of measurements 51, 61 of the received signal is available, made at consecutive moments $t_i$ from which it is possible using graphic tools such as mobile cursors 52 and 62, to determine in the best manner by smoothing or "visual filtering" the value of magnitudes $(\theta_A, \theta_B, \dot\theta_A, \dot\theta_B, f_A, f_B)$ at a reference moment $t_R$. These magnitudes are deduced from the positions and orientations of cursors in the view planes considered.

The potential values of $\dot\rho_A(t_R)$ and of $\dot\rho_B(t_R)$ and the corresponding values of $f_A(t_R)$ and $f_B(t_R)$ are thus determined, then step 23 includes, in this second implementation mode of the procedure according to an embodiment of the invention, in searching which of these values minimizes the criterion $\Delta$ defined by the following relation:

$$\Delta = |f_{0A} - f_{0B}| = \left| f_A(t_R) / \left(1 - \frac{\dot\rho_A(t_R)}{c}\right) - f_B(t_R) / \left(1 - \frac{\dot\rho_B(t_R)}{c}\right) \right| \quad [24]$$

where $f_{0A}$ and $f_{0B}$ represent the estimations of frequency $f_0$ of the signal when emitted (i.e. without Doppler effect), produced using measurements respectively related to the signal received on antenna A and the signal received on antenna B.

In the assumption where the potential values considered of $\dot\rho_A(t_R)$ and $\dot\rho_B(t_R)$) and the values of $f_A(t_R)$ and $f_B(t_R)$ correspond to the real location of the sources, the two values of the emitted frequency $f_{0A}$ and $f_{0B}$ obtained are similar and only differ one from the other due to measurement errors. The value of $\Delta$ is then minimal.

On the other hand, in the assumption where the potential values considered for $\dot\rho_A(t_R)$) and $\dot\rho_B(t_R)$ and $f_A(t_R)$ and $f_B(t_R)$ correspond to a ghost source, these two values $f_{0A}$ and $f_{0B}$ are appreciably different so that $\Delta$ is not minimal. Thus, the ambiguity affecting measurements made by antennas is clearly eliminated.

For the ease of understanding of the description, the different steps of the procedure according to the invention have been described in the two modes and for substantially all their variants in the specific case where the system is in the presence of a single source in the monitored zone. Naturally, this specific case does not define the limit of the scope of the invention; it may be implemented advantageously to eliminate the ambiguity concerning the real position of several distinct sources moving in the monitored zone.

The invention claimed is:

1. A method for elimination of ghost sources from a passive sonar, the passive sonar comprising at least two linear antennas A and B, the method comprising:
    measuring a received signal at one or more moments $t_i$, to determine one or more potential sources;
    determining, for the received signal at each of the at least two linear antennas, a Doppler frequency f and a potential value of an azimuth θ of each of the one or more potential sources;
    determining potential values of a speed of each of the one or more potential sources, by use of the azimuth θ and the Doppler frequency f values; and
    for each of the one or more potential sources, determining frequency and speed values that satisfy, for each moment $t_i$ measurement equations that link the frequency of the received signal to the frequency $f_0$ emitted by the potential source to the source speed and position of the potential source, to eliminate ghost signals which do not satisfy said measurement equations.

2. The method according to claim 1, in which the measurement equations used during the step of determining the frequency and speed values are determined in accordance with the following relationships:

$$f_A(t_i) = f_0[1-(v_x \cdot \sin\theta_A(t_i) + v_y \cdot \cos\theta_A(t_i))/c]$$

and $$f_B(t_i) = f_0[1-(v_x \cdot \sin\theta_B(t_i) + v_y \cdot \cos\theta_B(t_i))/c]$$

wherein:
c corresponds to a velocity of sound;
$v_x$ and $v_y$ correspond to components of a speed vector $\vec{V}$ of the source in a Cartesian reference system;
$f_A$, $f_B$ correspond to a frequency of the received signal at antennas A and B, respectively; and
$\theta_A$ and $\theta_B$ correspond to an azimuth measured for each of the at least two linear antennas A and B, respectively.

3. The method according to claim 2, wherein the step of determining the potential values of the speed of each of the one or more potential sources comprises the step of triangulating to determine the components $v_x$ and $v_y$ of the source speed.

4. The method according to claim 2, wherein the step of determining the potential values of the speed of each of the one or more potential sources comprises the steps of:
for each of the at least two linear antennas A and B, measuring frequency and azimuth of the received signal over N consecutive moments $t_i$, to produce N pair of measurements $f_A(t_i)$ and $\theta_A(t_i)$ respectively for linear antenna A, and to produce N pair of measurements $f_B(t_i)$ and $\theta_B(t_i)$ respectively for linear antenna B;
calculating a least-squares solution to a system of linear equations that is determined in accordance with the following relationship:

$$F = M \times X,$$

wherein:
X is a status vector determined in accordance with the following relationship: $X = [f_0; f_0 v_x; f_0 v_y]^T$;
× represents matrix multiplication;
M represents a measurement matrix with 2N lines, each line corresponding to a moment $t_i$, in which an expression for each line is one of $$M_A(t_i) = [1; -\sin\theta_A(t_i)/c; -\cos\theta_A(t_i)/c] \text{ for linear antenna A, and}$$

$$M_B(t_i) = [1; -\sin\theta_B(t_i)/c; -\cos\theta_B(t_i)/c] \text{ for linear antenna B; and}$$

wherein:
F represents a vector with 2N components that form N measurement pairs $(f_A(t_i), f_B(t_i))$ of the frequencies of the signal received by each antenna, measured at N moments $t_i$.

5. The method according to claim 2, wherein the step of determining the frequency and speed values that satisfy the measurement equations further comprises the steps of:
calculating, for each moment $t_i$, a value of a magnitude $v^m$ determined in accordance with the following relationship:

$$v^m(t_i) = (f_A(t_i) - f_B(t_i))/(f_A(t_i) + f_B(t_i)),$$

wherein $f_A(t_i)$ and $f_B(t_i)$ represent the frequency measurements of the signal received by the linear antennas A and B, respectively, at moment $t_i$;

calculating, for each potential source, a value of a magnitude v determined in accordance with the following relationship:

$$v(t_i) = \frac{v_x \cdot (\sin\theta_A(t_i) - \sin\theta_B(t_i)) + v_y \cdot (\cos\theta_A(t_i) - \cos\theta_B(t_i))}{v_x \cdot (\sin\theta_A(t_i) + \sin\theta_B(t_i)) + v_y \cdot (\cos\theta_A(t_i) + \cos\theta_B(t_i)) - 2c},$$

wherein $\theta_A(t_i)$ and $\theta_B(t_i)$ represent azimuths of linear antennas A and B, respectively, measured at moment $t_i$, for the potential source considered; and
calculating, for each potential source, a deviation $v - v^m$,
wherein the source being considered as real comprises the potential source for which the deviation $v - v^m$ is smallest.

6. The method according to claim 1, wherein the step of determining the potential values of the speed of each of the one or more potential sources further comprises the step of applying an extended Kalman filter to a status vector $X = [x; v_x; y; v_y; f_0]$, the status vector including a predetermined status noise, to estimate potential values of Cartesian components of a speed of the source that emits the measured signal and a corresponding frequency of the emitted signal.

7. The method according to claim 6, in which the measurement equations used during the step of determining the frequency and speed values are determined in accordance with the following relationships:

$$\theta_A = A\tan\frac{x_A}{y_A}$$

for the azimuth of linear antenna A;

$$\theta_B = A\tan\frac{x_B}{y_B}$$

for the azimuth of linear antenna B;

$$f_A(t_i) = f_0[1-(v_x \cdot \sin\theta_A(t_i) + v_y \cdot \cos\theta_A(t_i))/c] \text{ for the frequency of linear antenna A;}$$

and $$f_B(t_i) = f_0[1-(v_x \cdot \sin\theta_B(t_i;) + v_y \cdot \cos\theta_B(t_i))/c] \text{ for the frequency of linear antenna B,}$$

wherein:
c corresponds to a velocity of sound; and
$v_x$ and $v_y$ correspond to components of a speed vector $\vec{V}$ of the source in a Cartesian reference system.

8. The method according to claim 7, in which the step of determining the frequency and speed values that satisfy the measurement equations further comprises the steps of:
testing a frequency residual comprising deviations between frequencies $[f_A(t_i), f_B(t_i)]$, calculated by use of estimated values of the speed and values of azimuths at moment $t_i$, and the values $[f_A^m(t_i), f_B^m(t_i)]$ measured on samples of signals received at different moments $t_i$,
wherein the real position of the source is given by the source for which the residuals obtained are those substantially centered around zero.

9. The method according to claim 1, in which the measurement equations used during the step of determining the frequency and speed values that satisfy the measurement equations are determined in accordance with the following relationships:

$f_A(t) = f_0[1 - \dot{\rho}_A(t)/c]$ for linear antenna A; and $f_B(t) = f_0[1 - \dot{\rho}_B(t)/c]$ for linear antenna B, wherein:
$\dot{\rho}$ is a radial speed of the source; and
c corresponds to a velocity of sound.

10. The method according to claim 9, in which the values $\dot{\rho}_A(t_R)$ and $\dot{\rho}_B(t_R)$ are determined in accordance with the following relationships:

$\sin \theta_A(t_R) \cdot \dot{\rho}_A(t_R) - \sin \theta_B(t_R) \cdot \dot{\rho}_B(t_R) = -\cos \theta(t_R) \cdot \rho_A(t_R) \cdot \dot{\theta}_A(t_R) + \cos \theta_B(t_R) \cdot \rho_B(t_R) \cdot \dot{\theta}_B(t_R)$ $\cos \theta_A(t_R) \cdot \rho_A(t_R) \cdot \dot{\theta}_A(t_R) + \cos \theta_B(t_R) \cdot \rho_B(t_R) \cdot \dot{\theta}_B(t_R) = \sin \theta_A(t_R) \cdot \rho_A(t_R) \cdot \dot{\theta}_A(t_R) - \sin \theta_B(t_R) \cdot \rho_B(t_R) \cdot \dot{\theta}_B(t_R)$ wherein:
$\dot{\theta}_A$ and $\dot{\theta}_B$ represent the variations of azimuth measurement $\theta_A$ and $\theta_B$ over time; and
$t_R$ corresponds to a reference moment.

11. The method according to claim 10, wherein $\dot{\theta}_A(t_R)$ and $\dot{\theta}_B(t_R)$ are determined by Kalman filtering.

12. The method according to claim 10, wherein $\dot{\theta}_A(t_R)$ and $\dot{\theta}_B(t_R)$ are determined graphically.

13. The method according to claim 9, further comprising the step of determining the real position of the source detected, which includes the step of:
calculating the radial speed values $\dot{\rho}_A(t_R)$ and $\dot{\rho}_B(t_R)$ and frequency $f_A(t_R)$ and $f_B(t_R)$ values minimizing a likelihood criterion determined in accordance with the following relationship:

$$\Delta = |f_{0A} - f_{0B}| = \left| f_A(t_R) \bigg/ \left(1 - \frac{\dot{\rho}_A(t_R)}{c}\right) - f_B(t_R) \bigg/ \left(1 - \frac{\dot{\rho}_B(t_R)}{c}\right) \right|$$

wherein $f_{0A}$ and $f_{0B}$ represent the estimations of the frequency $f_0$ of the emitted signal, obtained by use of measurements respectively relative to the signal measured by antenna A and the signal measured by antenna B.

* * * * *